United States Patent
Langhammer et al.

(10) Patent No.: US 9,053,045 B1
(45) Date of Patent: Jun. 9, 2015

(54) COMPUTING FLOATING-POINT POLYNOMIALS IN AN INTEGRATED CIRCUIT DEVICE

(71) Applicant: Altera Corporation, San Jose, CA (US)

(72) Inventors: Martin Langhammer, Salisbury (GB); Bogdan Pasca, Chesham (GB)

(73) Assignee: Altera Corporation, San Jose, CA (US)

( * ) Notice: Subject to any disclaimer, the term of this patent is extended or adjusted under 35 U.S.C. 154(b) by 119 days.

(21) Appl. No.: 13/789,882

(22) Filed: Mar. 8, 2013

Related U.S. Application Data (63) Continuation-in-part of application No. 13/234,419, filed on Sep. 16, 2011.

(51) Int. Cl.
  *G06F 7/38* (2006.01)
  *G06F 17/10* (2006.01)
  *G06F 7/544* (2006.01)

(52) U.S. Cl.
  CPC ............... *G06F 17/10* (2013.01); *G06F 7/544* (2013.01)

(58) Field of Classification Search
  None
  See application file for complete search history.

(56) References Cited

U.S. PATENT DOCUMENTS

| | | | |
|---|---|---|---|
| 3,473,160 A | 10/1969 | Wahlstrom | |
| 3,800,130 A | 3/1974 | Martinson et al. | |
| 3,814,924 A | 6/1974 | Tate | |
| 3,896,299 A | 7/1975 | Rhodes | |
| 4,156,927 A | 5/1979 | McElroy et al. | |
| 4,179,746 A | 12/1979 | Tubbs | |
| 4,212,076 A | 7/1980 | Conners | |
| 4,215,406 A | 7/1980 | Gomola et al. | |
| 4,215,407 A | 7/1980 | Gomola et al. | |
| 4,422,155 A | 12/1983 | Amir et al. | |
| 4,484,259 A | 11/1984 | Palmer et al. | |
| 4,521,907 A | 6/1985 | Amir et al. | |
| 4,575,812 A | 3/1986 | Kloker et al. | |
| 4,597,053 A | 6/1986 | Chamberlin | |
| 4,616,330 A | 10/1986 | Betz | |
| 4,623,961 A | 11/1986 | Mackiewicz | |
| 4,682,302 A | 7/1987 | Williams | |

(Continued)

FOREIGN PATENT DOCUMENTS

| | | |
|---|---|---|
| EP | 0 158 430 | 10/1985 |
| EP | 0 326 415 | 8/1989 |

(Continued)

OTHER PUBLICATIONS

Altera Corporation, "Stratix II Device Handbook, Chapter 6—DSP Blocks in Stratix II Devices," v1.1, Jul. 2004.

(Continued)

*Primary Examiner* — Michael D Yaary
(74) *Attorney, Agent, or Firm* — Ropes & Gray LLP; Jeffrey H. Ingerman (57) ABSTRACT

Polynomial circuitry for calculating a polynomial having terms including powers of an input variable, where the input variable is represented by a mantissa and an exponent, includes at least one respective coefficient table for each respective term, each respective coefficient table being loaded with a plurality of respective instances of a coefficient for said respective term, each respective instance being shifted by a different number of bits. The circuitry also includes decoder circuitry for selecting one of the respective instances of the coefficient for each respective term based on the exponent and on a range, from among a plurality of ranges, of values into which that input variable falls.

22 Claims, 7 Drawing Sheets

(56) References Cited

U.S. PATENT DOCUMENTS

| | | |
|---|---|---|
| 4,718,057 A | 1/1988 | Venkitakrishnan et al. |
| 4,727,508 A | 2/1988 | Williams |
| 4,736,335 A | 4/1988 | Barkan |
| 4,754,421 A | 6/1988 | Bosshart |
| 4,777,614 A | 10/1988 | Ward |
| 4,791,590 A | 12/1988 | Ku et al. |
| 4,799,004 A | 1/1989 | Mori |
| 4,811,263 A | 3/1989 | Hedley et al. |
| 4,823,295 A | 4/1989 | Mader |
| 4,839,847 A | 6/1989 | Laprade |
| 4,871,930 A | 10/1989 | Wong et al. |
| 4,908,788 A | 3/1990 | Fujiyama |
| 4,912,345 A | 3/1990 | Steele et al. |
| 4,918,637 A | 4/1990 | Morton |
| 4,918,638 A | 4/1990 | Matsumoto et al. |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 4,999,803 A | 3/1991 | Turrini et al. |
| 5,068,813 A | 11/1991 | Thoen |
| 5,073,863 A | 12/1991 | Zhang |
| 5,081,604 A | 1/1992 | Tanaka |
| 5,122,685 A | 6/1992 | Chan et al. |
| 5,126,964 A | 6/1992 | Zurawski |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,373,461 A | 12/1994 | Bearden et al. |
| 5,375,079 A | 12/1994 | Uramoto et al. |
| 5,381,357 A | 1/1995 | Wedgwood et al. |
| 5,404,324 A | 4/1995 | Colon-Bonet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,623,377 A | 4/1997 | Behrens et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,026,420 A | 2/2000 | DesJardins et al. |
| 6,029,187 A | 2/2000 | Verbauwhede |
| 6,031,763 A | 2/2000 | Sansbury |
| 6,041,339 A | 3/2000 | Yu et al. |

(56) References Cited

U.S. PATENT DOCUMENTS

| | | |
|---|---|---|
| 6,041,340 A | 3/2000 | Mintzer |
| 6,052,327 A | 4/2000 | Reddy et al. |
| 6,052,755 A | 4/2000 | Terrill et al. |
| 6,052,773 A | 4/2000 | DeHon et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,346,824 B1 | 2/2002 | New |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,385,632 B1 | 5/2002 | Choe et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,578,060 B2 | 6/2003 | Chen et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,806,733 B1 | 10/2004 | Pan et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,917,955 B1 | 7/2005 | Botchev |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,024,446 B2 | 4/2006 | Langhammer et al. |
| 7,047,272 B2 | 5/2006 | Giacalone et al. |
| 7,061,268 B1 | 6/2006 | Lee et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,200,631 B2 | 4/2007 | Mailaender et al. |
| 7,230,451 B1 | 6/2007 | Langhammer |
| 7,313,585 B2 | 12/2007 | Winterrowd |
| 7,343,388 B1 | 3/2008 | Burney et al. |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,668,896 B2 | 2/2010 | Lutz et al. |
| 7,719,446 B2 | 5/2010 | Rosenthal et al. |
| 7,720,898 B2 | 5/2010 | Driker et al. |
| 7,769,797 B2 | 8/2010 | Cho et al. |
| 7,814,136 B1 | 10/2010 | Verma et al. |
| 7,814,137 B1 | 10/2010 | Mauer |
| 7,822,799 B1 | 10/2010 | Langhammer et al. |
| 7,836,117 B1 | 11/2010 | Langhammer et al. |
| 7,865,541 B1 | 1/2011 | Langhammer |
| 7,917,567 B1 | 3/2011 | Mason et al. |
| 7,930,335 B2 | 4/2011 | Gura |
| 7,930,336 B2 | 4/2011 | Langhammer |
| 7,949,699 B1 | 5/2011 | Neoh et al. |
| 7,974,997 B2 | 7/2011 | Arviv et al. |
| 8,041,759 B1 | 10/2011 | Langhammer et al. |
| 8,090,758 B1 | 1/2012 | Shimanek et al. |

(56) References Cited

U.S. PATENT DOCUMENTS

| | | |
|---|---|---|
| 8,112,466 B2 | 2/2012 | Minz et al. |
| 8,301,681 B1 | 10/2012 | Lee et al. |
| 8,307,023 B1 | 11/2012 | Leung et al. |
| 8,386,550 B1 | 2/2013 | Mauer et al. |
| 8,386,553 B1 | 2/2013 | Langhammer et al. |
| 8,396,914 B1 | 3/2013 | Langhammer |
| 2001/0023425 A1 | 9/2001 | Oberman et al. |
| 2001/0029515 A1 | 10/2001 | Mirsky |
| 2001/0037351 A1 | 11/2001 | Hellberg |
| 2001/0037352 A1 | 11/2001 | Hong |
| 2002/0002573 A1 | 1/2002 | Landers et al. |
| 2002/0032713 A1 | 3/2002 | Jou et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2002/0129073 A1 | 9/2002 | Page et al. |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bhushan et al. |
| 2005/0038842 A1 | 2/2005 | Stoye |
| 2005/0120122 A1 | 6/2005 | Farnham |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187997 A1 | 8/2005 | Zheng et al. |
| 2005/0187999 A1 | 8/2005 | Zheng et al. |
| 2005/0262175 A1 | 11/2005 | Iino et al. |
| 2006/0020655 A1 | 1/2006 | Lin |
| 2006/0059215 A1 | 3/2006 | Maharatna et al. |
| 2006/0112160 A1 | 5/2006 | Ishii et al. |
| 2006/0200732 A1* | 9/2006 | Dobbek et al. ............... 714/782 |
| 2007/0083585 A1 | 4/2007 | St. Denis et al. |
| 2007/0124352 A1 | 5/2007 | Wittig |
| 2007/0185951 A1 | 8/2007 | Lee et al. |
| 2007/0185952 A1 | 8/2007 | Langhammer et al. |
| 2007/0226287 A1 | 9/2007 | Lin et al. |
| 2007/0241773 A1 | 10/2007 | Hutchings et al. |
| 2008/0133627 A1 | 6/2008 | Langhammer et al. |
| 2008/0159441 A1 | 7/2008 | Liao et al. |
| 2008/0183783 A1 | 7/2008 | Tubbs |
| 2009/0028455 A1 | 1/2009 | Nakamura et al. |
| 2009/0083358 A1 | 3/2009 | Allen |
| 2009/0113186 A1 | 4/2009 | Kato et al. |
| 2009/0164544 A1* | 6/2009 | Dobbek et al. ............... 708/503 |
| 2009/0172052 A1 | 7/2009 | DeLaquil et al. |
| 2009/0187615 A1 | 7/2009 | Abe et al. |
| 2009/0228689 A1 | 9/2009 | Muff et al. |
| 2009/0300088 A1 | 12/2009 | Michaels et al. |
| 2010/0098189 A1 | 4/2010 | Oketani |
| 2010/0131577 A1 | 5/2010 | Gangalakurti et al. |
| 2010/0146022 A1 | 6/2010 | Swartzlander et al. |
| 2010/0191939 A1 | 7/2010 | Muff et al. |
| 2011/0161389 A1 | 6/2011 | Langhammer et al. |
| 2011/0219052 A1 | 9/2011 | Langhammer |
| 2011/0238720 A1 | 9/2011 | Langhammer |
| 2011/0320513 A1 | 12/2011 | Langhammer |
| 2012/0054254 A1 | 3/2012 | Langhammer |
| 2012/0054256 A1 | 3/2012 | Langhammer |
| 2012/0113133 A1 | 5/2012 | Shpigelblat |
| 2012/0166512 A1 | 6/2012 | Wong et al. |
| 2012/0191967 A1 | 7/2012 | Lin et al. |
| 2012/0290819 A1 | 11/2012 | Langhammer |

FOREIGN PATENT DOCUMENTS

| | | |
|---|---|---|
| EP | 0 380 456 | 8/1990 |
| EP | 0 411 491 | 2/1991 |
| EP | 0 419 105 | 3/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 049 025 | 11/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO 2005/066832 | 7/2005 |
| WO | WO 2005/101190 | 10/2005 |
| WO | WO 2010/102007 | 9/2010 |

OTHER PUBLICATIONS

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices," *Stratix II Device Handbook*, vol. 2, Chapter 6, v4.0 (Oct. 2005).

Altera Corporation, "FIR Compiler: MegaCore® Function User Guide," version 3.3.0, rev. 1, pp. 3-11 through 3-15 (Oct. 2005).

Altera Corporation, "Advanced Synthesis Cookbook: A Design Guide for Stratix II, Stratix III and Stratix IV Devices," Document Version 3.0, 112 pgs., May 2008.

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings* (Lecture Notes in Computer Science vol. 1896), Aug. 27-30, 2000, pp. 456-461.

Aoki, T., "Signed-weight arithmetic and its application to a field-programmable digital filter architecture," *IEICE Transactions on Electronics*, 1999 , vol. E82C, No. 9, Sep. 1999, pp. 1687-1698.

(56) References Cited

OTHER PUBLICATIONS

Ashour, M.A., et al., "An FPGA implementation guide for some different types of serial-parallel multiplier-structures," *Microelectronics Journal*, vol. 31, No. 3, 2000, pp. 161-168.

Berg, B.L., et al. "Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54× DSP", Application Report SPRA610, Dec. 1999, pp. 1-10.

Colet, P., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

deDinechin, F. et al., "Large multipliers with less DSP blocks," retrieved from http://hal-ens-lyon.archives-ouvertes.fr/ensl-00356421/en/, 9 pgs., 2009.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL '98. Proceedings*, Hartenstein, R.W., et al., eds., Aug. 31-Sep. 3, 1998, pp. 441-445.

Farooqui, A., et al., "General Data-Path Organization of a MAC unit for VLSI Implementation of DSP Processors," ISCAS '98, Part 2, May 31, 1998-Jun. 3, 1998, pp. 260-263.

Fujioka, Y., et al., "240 MOPS Reconfigurable Parallel VLSI Processor for Robot Control", Proceedings of the 1992 International Conference on Industrial Electronics, Control, Instrumentation, and Automation, vol. 3, pp. 1385-1390, Nov. 9-13, 1992.

Gaffer, A.A., et al., "Floating-Point Bitwidth Analysis via Automatic Differentiation," *IEEE Conference on Field Programmable Technology*, Hong Kong, Dec. 2002.

Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)*, Jun. 2005.

Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.

Guccione, S.A., "Run-time Reconfiguration at Xilinx " *Parallel and distributed processing: 15 IPDPS 2000 workshops*, Rolim, J., ed., May 1-5, 2000, p. 873

Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.

Haynes, S.D., et al., "Configurable multiplier blocks for embedding in FPGAs," *Electronicas Letters*, vol. 34, No. 7, pp. 638-639 (Apr. 2, 1998).

Heysters, P.M., et al., "Mapping of DSP algorithms on field programmable function arrays," *Field-Programmable Logic and Applications. Roadmap to Reconfigurable Computing. 10th International Conference, FPL 2000. Proceedings* (Lecture Notes in Computer Science vol. 1896), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International.Conference on Asic Proceedings* (IEEE Cat. No. 96TH8140) Oct. 21-24, 1996, pp. 275-279.

Jones, G., "Field-programmable digital signal conditioning," *Electronic Product Design*, vol. 21, No. 6, Jun. 2000, pp. C36-38.

Karlstrom, K., et al., "High Performance, Low Latency FPGA based Floating Point Adder and Multiplier Units in a Virtex 4," Norchip Conf., pp. 31-34, 2006.

Kiefer, R., et al., "Performance comparison of software-FPGA hardware partitions for a DSP application " *14th Australian Microelectronics Conference. Microelectronics: Technology Today for the Future. MICRO '97 Proceedings*, Sep. 28-Oct. 1, 1997, pp. 88-93.

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Kramberger, I., "DSP acceleration using a reconfigurable FPGA," *ISIE '99. Proceedings of the IEEE International Symposium on Industrial Electronics* (Cat. No. 99TH8465), vol. 3 , Jul. 12-16, 1999, pp. 1522-1525.

Langhammer, M., "How to implement DSP in programmable logic," *Elettronica Oggi*, No. 266 , Dec. 1998, pp. 113-115.

Langhammer, M., "Implementing a DSP in Programmable Logic," *Online EE Times*, May 1998, http:--www.eetimes.com-editorial-1998-coverstory9805.html.

Lazaravich, B.V., "Function block oriented field programmable logic arrays," *Motorola, Inc. Technical Developments*, vol. 18, Mar. 1993, pp. 10-11.

Lattice Semiconductor Corp, *ORCA® FPGA Express™ Interface Manual:ispLEVER® Version 3.0*, 2002.

Lucent Technologies, Microelectronics Group, "Implementing and Optimizing Multipliers in ORCA™ FPGAs,", Application Note. AP97-008FGPA, Feb. 1997.

Lund, D., et al., "A new development system for reconfigurable digital signal processing," First International Conference on 3G Mobile Communication Technologies (Conf. Publ. No. 471), Mar. 27-29, 2000, pp. 306-310.

Martinson, L. et al., "Digital matched Filtering with Pipelined Floating Point Fast Fourier Transforms (FFT's)" *IEEE Transactions on Acoustics, Speech, and Signal Processing*, vol. ASSP-23, No. 2, pp. 222-234, Apr. 1975.

Miller, N. L., et al., "Reconfigurable integrated circuit for high performance computer arithmetic," *Proceedings of the 1998 IEE Colloguium on Evolvable Hardware Systems (Digest)*, No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nakasato, N., et al., "Acceleration of Hydrosynamical Simulations using a FPGA board" *The Institute of Electronics Information and Communication Technical , Report CPSY2005-47*, vol. 105, No. 515, Jan. 17, 2006.

Nedjah, N., et al., "Fast Less Recursive Hardware for Large Number Multiplication Using Karatsuba-Ofman's Algorithm," *Computer and Information Sciences—ISCIS*, pp. 43-50, 2003.

Nozal, L., et al., "A new vision system: programmable logic devices and digital signal processor architecture (PLD×DSP)," *Proceedings IECON '91. 1991 International Conference on Industrial Electronics, Control and Instrumentation* (Cat. No. 91CH2976-9), vol. 3, Oct. 28-Nov. 1, 1991, pp. 2014-2018.

Osana, Y., et al., "Hardware-resource Utilization Analysis on an FPGA-Based Biochemical Simulator ReCSiP", *The Institute of Elec-*

(56) References Cited

OTHER PUBLICATIONS tronics Information and Communication Technical Report CPSY2005-63, vol. 105, No. 516, Jan. 18, 2006.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)* vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303) Jul. 26-28,1999, pp. 147-150.

Texas Instruments Inc., "TMS320C54x DSP Reference Set, vol. 1: CPU and Peripherals", Literature Number: SPRU131F, Apr. 1999, pp. 2-1 through 2-16 and 4-1 through 4-29.

Thapliyal, H., et al., "Combined Integer and Floating Point Multiplication Architecture (CIFM) for FPGSs and Its Reversible Logic Implementation", *Proceedings MWSCAS 2006*, Puerto Rico, 5 pages, Aug. 2006.

Thapliyal, H., et al., "Combined Integer and Variable Precision (CIVP) Floating Point Multiplication Architecture for FPGAs", *Proceedings of the 2007 International Conference on Parallel and Distributed Processing Techniques and Applications (PDPTA'07)*, Las Vegas, US, vol. 1, pp. 449-450, Jun. 2007.

Tisserand, A., et al., "An on-line arithmetic based FPGA for low power custom computing," *Field Programmable Logic and Applications, 9th International Workshop, FPL'99, Proceedings* (Lecture Notes in Computer Science vol. 1673), Lysaght, P., et al., eds., Aug. 30-Sep. 1, 1999, pp. 264-273.

Tralka, C., "Symbiosis of DSP and PLD," *Elektronik*, vol. 49, No. 14, Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Vladimirova, T. et al., "Floating-Point Mathematical Co-Processor for a Single-Chip On-Board Computer," *MAPLD'03 Conference*, D5, Sep. 2003.

Wajih, E.-H.Y. et al., "Efficient Hardware Architecture of Recursive Karatsuba-Ofman Multiplier," $3^{rd}$ *International Conference on Design and Technology of Integrated Systems in Nanoscale Era*, 6 pgs, Mar. 2008.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Xilinx Inc., "Complex Multiplier v2.0", DS291 Product Specification/Datasheet, Nov. 2004.

Xilinx, Inc., "Virtex-5 ExtremeDSP Design Considerations," *User Guide UG193*, v2.6, 114 pages, Oct. 2007.

Xilinx, Inc., "Implementing Barrel Shifters Using Multipliers", p. 1-4, Aug. 17, 2004.

Zhou, G. et al., "Efficient and High-Throughput Implementations of AES-GCM on FPGAs," *International Conference on Field-Programmable Technology*, 8 pgs., Dec. 2007.

de Dinechin F.,et al., "FPGA—Specific Custom Arithmetic Datapath Design: LIP Research Report RR2010-34," Dec. 2010, 8 pages.

IEEE Standard for Binary Floating-Point Arithmetic, *ANSI/IEEE Standard, Std 754*, 1985, pp. 1-14.

IEEE Standard for Floating-Point Arithmetic, *IEEE Std 754*, 2008, pp. 1-58.

Langhammer, "Floating Point Datapath Synthesis for FPGAs," *IEEE International Conference on Field Programmable Logic and Applications, 2008* (FPL 2008), pp. 355-360 (Sep. 8-10, 2008).

\* cited by examiner

COMPUTING FLOATING-POINT POLYNOMIALS IN AN INTEGRATED CIRCUIT DEVICE

CROSS REFERENCE TO RELATED APPLICATION

This is a continuation-in-part of copending, commonly-assigned U.S. patent application Ser. No. 13/234,419, filed Sep. 16, 2011, which is hereby incorporated by reference herein in its entirety.

FIELD OF THE INVENTION

This invention relates to computing floating-point polynomials in integrated circuit devices such as programmable logic devices (PLDs), and particularly to computing floating-point polynomials using fixed-point resources.

BACKGROUND OF THE INVENTION

Horner's rule (also referred to as Horner's scheme or Horner's algorithm) is an efficient way of calculating polynomials, useful for both hardware and software.

A polynomial can be described as:

$$p(x) = \sum_{i=0}^{n} a_i x^i = a_0 + a_1 x + a_2 x^2 + a_3 x^3 + \ldots + a_n x^n \quad (1)$$

For an example where n=5, this can be reformatted using Horner's rule as:

$$p(x) = a_0 + x(a_1 + x(a_2 + x(a_3 + x(a_4 + a_5 x)))) \quad (2)$$

This has the advantage of removing the calculations of powers of x (the result would be similar for any n, except that the number of terms would be different). There are still as many addition operations as there are coefficients, and as many multiplication operations as there are terms of x. For this case of n=5, there are five addition operations, and five multiplication operations.

However, even for a small number of terms, substantial resources may be required. For example, applications in which these operations are used frequently call for double-precision arithmetic (11-bit exponent and 52-bit mantissa). In a PLD such as those sold by Altera Corporation under the trademark STRATIX®, this could translate to approximately 8,500 adaptive look-up tables (ALUTs) and 45 18×18 multipliers. There also are applications calling for quadruple-precision arithmetic (15-bit exponent and 112-bit mantissa), requiring even more resources.

SUMMARY OF THE INVENTION

The present invention relates to method and circuitry for implementing floating-point polynomial series calculations using fixed-point resources. This reduces the amount of resources required, and also reduces datapath length and therefore latency. Some embodiments of the invention are particularly well-suited to applications for which the input range can be kept small. Other embodiments are suited for larger inputs. The circuitry can be provided in a fixed logic device, or can be configured into a programmable integrated circuit device such as a programmable logic device.

According to one aspect of the invention, denormalization operations are performed using the coefficients, instead of using arithmetic and logic resources to calculate and implement the denormalization, and the renormalization requires only a single-bit calculation. The remainder of the calculation can be carried out as a fixed-point calculation, consuming corresponding device area and with corresponding latency, while the results are equivalent to performing the same calculation using double-precision floating-point arithmetic.

In accordance with embodiments of the invention, there is provided polynomial circuitry for calculating a polynomial having terms including powers of an input variable, where the input variable is represented by a mantissa and an exponent. The circuitry includes at least one respective coefficient table for each respective term, each respective coefficient table being loaded with a plurality of respective instances of a coefficient for said respective term, each respective instance being shifted by a different number of bits. The circuitry also includes decoder circuitry for selecting one of the respective instances of the coefficient for each respective term based on the exponent and on a range, from among a plurality of ranges, of values into which that input variable falls.

A method of configuring a programmable device as such polynomial circuitry is also provided, and a non-transitory machine-readable data storage medium is provided that is encoded with software for performing the method of configuring such circuitry on a programmable device.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Circuitry according to the invention implements Horner's rule for floating-point polynomial calculations by using the coefficients to perform denormalization and performing the remainder of the calculation as a fixed-point calculation. For any particular implementation of a polynomial calculation, each coefficient may be stored in a table as multiple versions of itself, each shifted a different amount. The exponent of the coefficient term could function as the index to the table, selecting the correct shifted version.

Different ranges of coefficient values may be applicable to different ranges of input values. For example, for small inputs (i.e., input values less than 1), coefficient values for the higher-order terms of the polynomial are rarely needed, because the contributions from the higher-order terms are generally beyond the precision of the output. At the opposite extreme, for inputs much greater than 1, coefficient values for the higher-order terms may be the most significant, because those terms will contribute the most to the output.

An embodiment of the invention for small inputs (i.e., inputs less than 1) may be understood by reference to an example of the inverse tangent ($\tan^{-1}$, ATAN or arctan) function. The inverse tangent function can be computed using the following series:

$$\arctan(x) = x - \frac{x^3}{3} + \frac{x^5}{5} - \frac{x^4}{7} \ldots \quad (3)$$

Using Horner's rule, this can be expressed as:

$$\arctan(x) = x + x^3\left(\frac{-1}{3} + \frac{x^2}{5} - \frac{x^4}{7}\ldots\right) \quad (4)$$

$$\arctan(x) = x + x\left(0 + x\left(0 + x\left(\frac{-1}{3} + x\left(0 + \frac{x}{5}\right)\ldots\right)\right)\right) \quad (5)$$

This uses two adders and five multipliers, although if equation (4) is limited to two terms it can be implemented using two adders and only three multipliers.

For an inverse tangent calculation, an accurate estimate is required for only a small range. This is also true of most other trigonometric functions. For example, a good tradeoff for a double-precision inverse tangent implementation would require an input range of $0$-$2^{-10}$ radians. For 52-bit precision as used in double-precision arithmetic, with a 10-bit input range, the second term would be 20 bits ($x^3$–$x$) to the right of the first term, and the third term would be 40 bits ($x^5$–$x$) to the right. The next term would be 60 bits to the right, and therefore can be ignored for this example of 52-bit precision. However, the invention would apply no matter how many terms were used.

As the second term is 20 bits to the right, it will have a maximum contribution of 32 bits (52 bits-20 bits) to the final result, and can therefore be well-represented with 36-bit precision. Similarly, as the third term is 40 bits to the right, it will have a maximum contribution of only 12 bits, and can therefore be well-represented by 18 bits.

If the input is less than $2^{-10}$, then the following terms will have even smaller contributions based on their powers. For example, if the input is $2^{-12}$, the second term will be 24 bits to the right and the third term will be 48 bits to the right. For inputs of $2^{-14}$ or less, even the third term contribution will be more than 56 bits to the right and make a negligible contribution to the result.

A full floating-point adder is not required to add together the terms. As long as the input is less than (or equal to) 1, each term will be less than its preceding term, so that swapping of operands is not required, and denormalization can be applied to the smaller term immediately. In fact, the denormalization shift can be applied directly to all of the following terms immediately, as each can be calculated in relation to the first term simultaneously.

For inputs greater than 1, the higher-order terms tend to make an increasingly, rather than decreasingly, dominant contribution. However, the denormalization techniques described herein can still apply.

As noted above, according to embodiments of the invention, the denormalization shifts are not applied as separate operations, but are applied to the coefficients. Therefore, they may be implemented as multiplications by constants. For example, in current PLD (e.g., FPGA) architectures, it is usually more efficient to implement such multiplications in specialized processing blocks (e.g., DSP blocks) that include fixed arithmetic structures with configurable interconnect, rather than in general-purpose programmable logic.

Regardless of how the multiplication operations are implemented, in accordance with embodiments of the invention, each coefficient may be represented by a table of shifted coefficients. The exponent of the term to which the coefficient is applied determines the required degree of shifting, and therefore functions as an index into the coefficient table.

Examples of the coefficient tables for the inverse tangent example, described above, where the inputs are less than 1, are shown in Tables 1 and 2 (below) for the second and third terms, respectively, of the "inner series" of Equation (4). The value in the first column of each table is the address/index corresponding to the exponent of the value of the input x, expressed in binary form. The value in the second column of each table is the coefficient itself. From each entry to the next, the coefficient, if expressed in binary form, would be shifted by the product of the index and the power of the corresponding term of the series. However, to save space, the shifted coefficient values, which are signed binary numbers, are represented by the equivalent hexadecimal values. Thus, in Table 1, the coefficient values are eight-character hexadecimal values representing 32-bit signed binary values, while in Table 2, the coefficient values are five-character hexadecimal values representing 20-bit signed binary values:

TABLE 1

| Index | Coefficient |
| --- | --- |
| 00000 | AAAAAAAA |
| 00001 | EAAAAAAA |
| 00010 | FAAAAAAA |
| 00011 | FEAAAAAA |
| 00100 | FFAAAAAA |
| 00101 | FFEAAAAA |
| 00110 | FFFAAAAA |
| 00111 | FFFEAAAA |
| 01000 | FFFFAAAA |
| 01001 | FFFFEAAA |
| 01010 | FFFFFAAA |
| 01011 | FFFFFEAA |
| 01100 | FFFFFFAA |
| 01101 | FFFFFFEA |
| 01110 | FFFFFFFA |
| 01111 | FFFFFFFE |
| 10000 | FFFFFFFF |
| >10000 | 00000000 |

TABLE 2

| Index | Coefficient |
| --- | --- |
| 00000 | 1999A |
| 00001 | 0199A |
| 00010 | 0019A |
| 00011 | 0001A |
| 00100 | 00002 |
| >00100 | 00000 |

In the examples shown, the second term will have 17 possible exponent values including the original unshifted value (32 bits of input range, with each successive shifted value decreasing by 2 bits per bit of reduction of the input power) as shown in Table 1, and the third term will have five possible exponent values including the original unshifted value (18 bits of input range, with each successive shifted value decreasing by 4 bits per bit of reduction of the input power) as shown in Table 2. In other embodiments, these tables may be somewhat larger, to allow at least some small contribution into the least significant bit position of the result.

Figure 1:
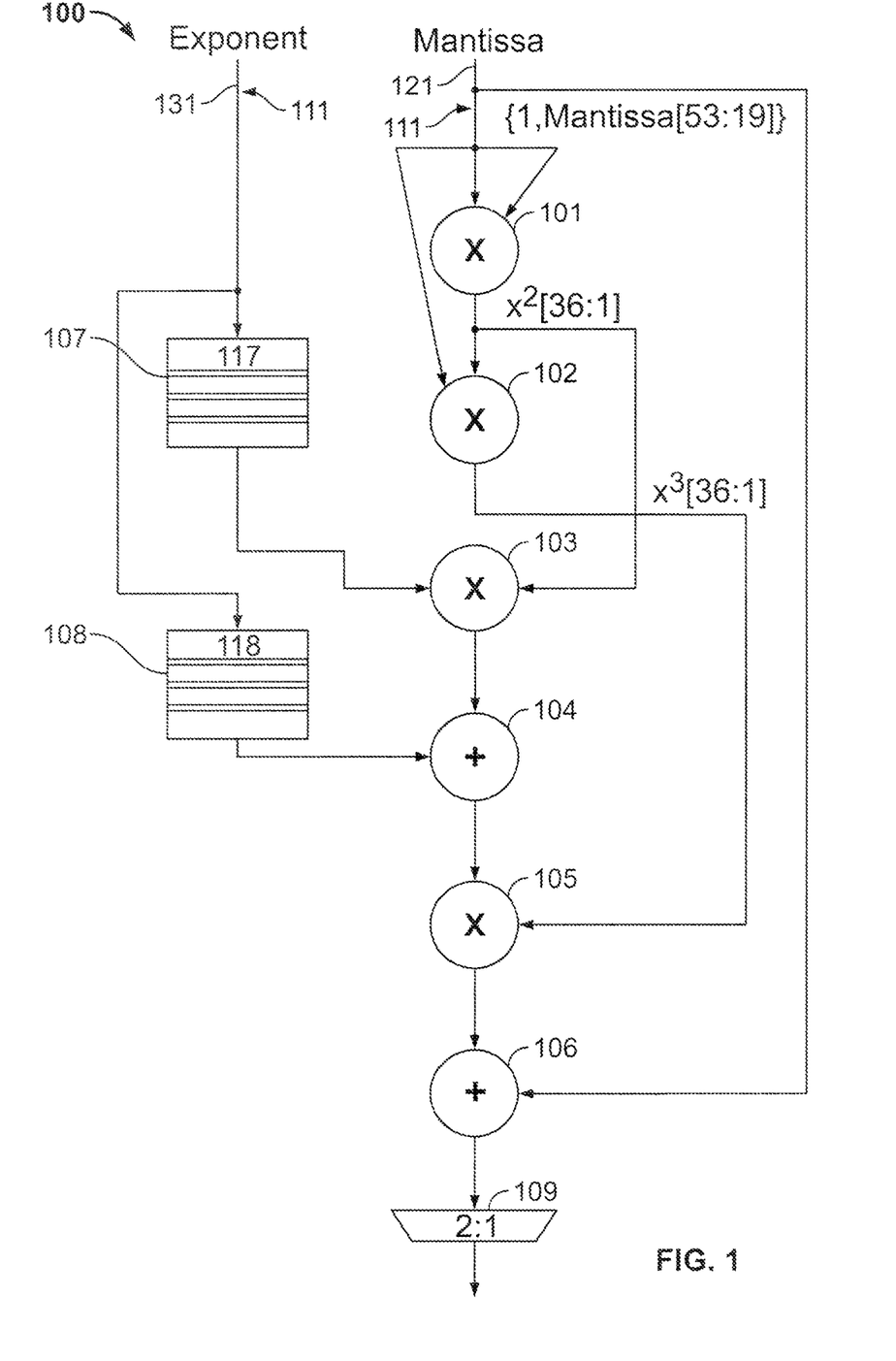
FIG. 1 shows an example of circuitry according to an embodiment of the invention.

FIG. 1 shows an embodiment of circuitry 100 for implementing Equation (4) according to an embodiment of the invention.

The input 101 is in double-precision format, including a 52-bit mantissa 111 (not including an implied leading '1') and an 11-bit exponent 121. As part of the conversion to fixed-point processing, the mantissa is expanded to 53 bits by converting the implied leading '1' to an actual leading '1'. The $x^3$ term is calculated to 36-bit precision, by multiplying x by itself using a 36×36 bit fixed-point multiplier 101, and multiplying that result by x using another 36×36 bit fixed-point multiplier 102. The upper 36 bits of x are used in each multiplication operation. x is inherently aligned with itself for the first fixed-point operation, while $x^2$ is aligned with x for the second fixed-point operation.

To calculate the "inner series" of Equation (4), the upper 18 bits of the $x^2$ term are multiplied, using fixed point multiplier 103, with the output of the third term coefficient table 107. Third term coefficient table 107 is addressed by the input exponent through address circuitry 117, to select the properly-shifted version of the coefficient, which is provided in an unnormalized fixed-point format. The result of that multiplication, right-shifted by 20 bits, is added to the 36-bit output of the second term coefficient table 108, which also is provided in an unnormalized fixed-point format, using a 36-bit fixed-point adder 104. Like third term coefficient table 107, second term coefficient table 108 is indexed by the input exponent through address circuitry 318 to select the properly-shifted version of the coefficient.

That completes the first two terms of the "inner series." As noted above, in this example, the third and subsequent terms are beyond the 52-bit precision of the system and therefore need not be computed. For systems of different precision, or where different numbers of bits are provided in the inputs or coefficients, it is possible that a different number of terms of the "inner series" may be calculated.

The 36-bit inner series result is then multiplied by the $x^2$ term using a 36×36-bit fixed-point multiplier 305. The upper 36 bits of that product, right-shifted by 20 bits, are added to the prefixed input mantissa 101 by 53-bit fixed point adder 106.

The mantissa is then normalized. Because the sum of all of the following terms would always be very small—i.e., less than $0.5_{10}$—only a 1-bit normalization is needed (i.e., a 1-bit shift will be applied where needed). The 1-bit normalization can be carried out using a 52-bit 2:1 multiplexer 109.

As can be seen, this example uses two 36×36 fixed-point multipliers (101 and 105) and two 18×18 fixed-point multipliers (102 and 103), as well as one 36-bit fixed-point adder 304, one 53-bit fixed-point adder 106, and one 52-bit 2:1 multiplexer, as well as memories for the coefficient tables 107, 108. In all, if this example is implemented in a STRATIX® PLD of the type described above, 188 adaptive look-up tables and 14 18×18 fixed-point multipliers are used. This is much smaller than previously-known hardware implementations of Horner's method.

Specifically, a brute-force double-precision floating-point implantation of Equation (4) would use about 4000 adaptive look-up tables and 27 18×18 fixed-point multipliers. By finding an optimal translation to fixed-point arithmetic, the required resources are greatly reduced when implementing the present invention. The latency also is much smaller, at about 10 clocks, which is less than the latency of a single double-precision floating-point multiplier or adder by itself.

Although the example described above in connection with FIG. 1 is based on x≤1 and involved a polynomial including only odd powers of x ($x^3$, $x^5$, ... ), the invention can be used with a polynomial including only even powers of x ($x^2$, $x^4$, ... ) or including all powers of x ($x^2$, $x^3$, $x^4$, $x^5$, ... ). More generally, the higher powers would be multiplied out first, and the lower powers would be computed by shifting relative to the higher powers, with that shifting coded into the coefficient tables. Looked at another way, a power of x, up to the largest common power of x greater than 1 ($x^3$ in the example, but possibly as low as $x^2$) would be factored out and multiplied first. Only terms in the remaining factored polynomial whose powers of x did not exceed the precision of the system would be retained. Each term would be shifted according to its power of x, with that shifting being coded into the coefficient tables, to provide an intermediate result. That intermediate result would be multiplied by the factored-out common power of x to provide the final result.

Although these techniques have been described so far for cases where |x|≤1 (sign being handled separately using known techniques), the techniques can be generalized for polynomials in which |x| has any value, whether greater than 1 or less than or equal to 1.

Figure 2:
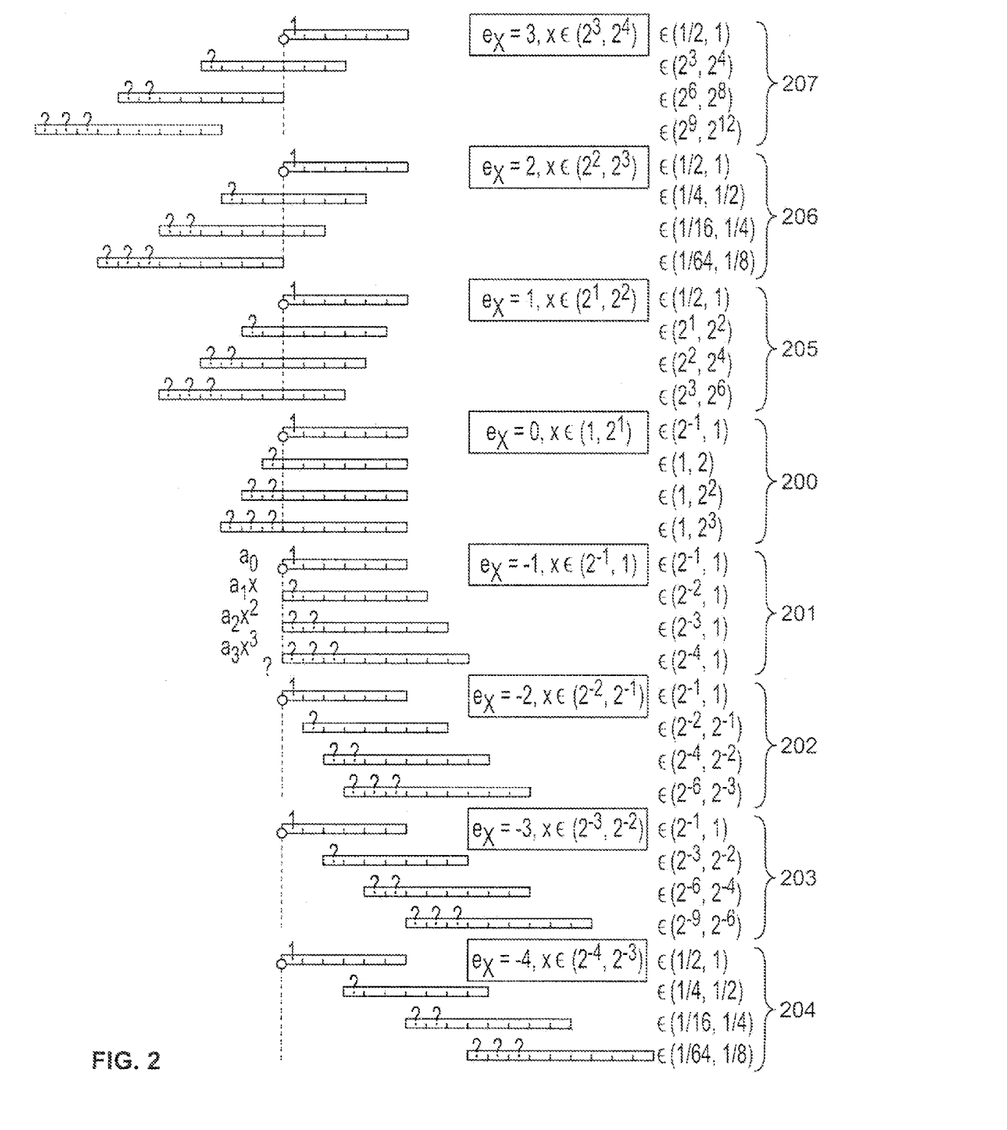
FIG. 2 shows an example of sets of shifted exponents for different ranges of input values.

FIG. 2 shows the alignment of the terms for various ranges of input values for a simplified exemplary floating-point format with 5 fractional or mantissa bits. The number of bits in an actual implementation would be determined by the precision desired. For example, according the IEEE754-2008 standard for implementing floating-point arithmetic in electronic devices, "half-precision" numbers have 5 exponent bits and 11 mantissa bits, "single-precision" numbers have 8 exponent bits and 23 mantissa bits, "double-precision" numbers have 11 exponent bits and 52 mantissa bits, and "quadruple-precision" numbers have 15 exponent bits and 112 mantissa bits.

As already noted, as x gets closer to zero, the higher order terms (i closer to n) also tend to zero, and have an increasingly lower contribution in the final result. In fact, below a certain threshold value of x very close to zero, even the contribution of the i=1 term $xa_1$ may have a weight lower than the accuracy of the i=0 term $a_0$. In such a case the result of the evaluation would be $a_0$.

Indeed, the range of the exponent that needs to be examined may be smaller than the actual range of the exponent of the input. For many functions f(x), such as certain trigonometric functions, f(x)≈x when x is very small (to the precision required to represent the result accurately). For example, for the inverse tangent function (arctan), all inputs smaller than (i.e., having exponents at least as highly negative as) exponent=−30 will return the same value in double precision, even though the exponent in double precision can be as small as (i.e., as highly negative as) −1022.

In FIG. 2, term alignment 200, where the exponent of x is zero, meaning that x is a binary number between 1.0 and 1.1111 ... , equivalent to a decimal number between 1.0 and 1.9999 ... (i.e., between 1 and 2, as indicated), may be considered a baseline alignment. Term alignments 201, 202, 203, 204 in the lower portion of FIG. 2 represent decreasing values of the exponent of x, and corresponding decreasing values of the range of x as indicated. Term alignments 205, 206, 207 in the upper portion of FIG. 2 represent increasing values of the exponent of x, and corresponding increasing values of the range of x as indicated. As the value of x increases, the higher order terms tend to make an increasingly dominant contribution to the final result.

Whether $x \le 1$ or $x > 1$, two factors contribute to the relative alignment of the terms. A first factor, which is contributed by the coefficients, is fixed and could be hardwired in a fixed-point implementation. A second factor, which is contributed by $x^i$, and specifically by the exponent of x, can either be positive (when $x > 1$), or negative (when $x \le 1$).

An example where n=2 is illustrative:

$$p(x) = a_0 + x(a_1 + xa_2)$$

For simplicity, assume that the signs of the coefficients and of x are positive:

$$p(x) = 2^{e_{a0}} 1 \cdot f_{a0} + 2^{e_x} 1 \cdot f_x (2^{e_{a1}} 1 \cdot f_{a1} + (2^{e_x} 1 \cdot f_x \times 2^{e_{a2}} 1 \cdot f_{a2}))$$

where for any number q represented in binary form, $e_q$ is the exponent of q and $f_q$ is the mantissa of q. This may be regrouped as follows to associate the scaling produced by $x^i$ with the corresponding coefficient $a_i$:

$$p(x) = 2^{e_{a0}} 1 \cdot f_{a0} + 1 \cdot f_x (2^{(e_{a1} + e_x)} 1 \cdot f_{a1} + 1 \cdot f_x (2^{(e_{a2} + 2e_x)} 1 \cdot f_{a2}))$$

where $2^{(e_{a1} + e_x)} 1 \cdot f_{a1}$ represents $a_1$ scaled by $e_x$, and $2^{(e_{a2} + 2e_x)} 1 \cdot f_{a2}$ represents $a_2$ scaled by $2e_x$.

Figure 3:
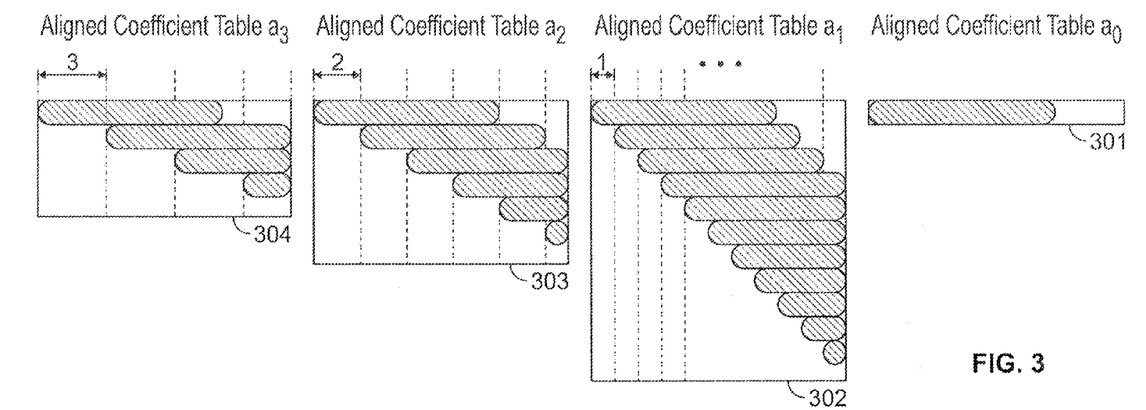
FIG. 3 shows an example of a set of coefficient tables for one range of input values.

The tabulated shifts for the coefficients when $x \le 1$ have a particular pattern relative to $a_0$ (table 301) as presented in FIG. 3. Coefficient $a_1$ (table 302) is shifted right in increments of one binary position as the $e_x$ decreases. Coefficient $a_2$ (table 303) is shifted right in increments of two positions as $e_x$ decreases, and so on through $a_n$ (here $a_3$, table 304)

Thus, for $x \le 1$ the evaluation of the polynomial can be performed as a fixed-point operation, once the terms of order greater than zero are aligned against $a_0$. The alignment of each term depends only on the exponent of x, $e_x$. Therefore, the correspondingly aligned coefficient may be obtained from a table indexed by $e_x$.

As previously noted, for the case where $x > 1$, the dominant terms will be the higher-order terms. In this case, we can write the same example polynomial to align the lower-order terms against the highest-order term, scaling up the final result by $2^{2e_x}$, or more generally, by $2^{ne_x}$ for an nth-order polynomial (in this example, n=2):

$$p(x) = 2^{e_{a0}} 1 \cdot f_{a0} + 1 \cdot f_x (2^{(e_{a1} + e_x)} 1 \cdot f_{a1} + 1 \cdot f_x (2^{(e_{a2} + 2e_x)} 1 \cdot f_{a2})) = \\ 2^{2e_x} (2^{e_{a0} - 2e_x} 1 \cdot f_{a0} 1 \cdot f_x (2^{e_{a1} - e_x} 1 \cdot f_{a1} + 1 \cdot f_x (2^{e_{a2}} 1 \cdot f_{a2})))$$

where $2^{e_{a0} - 2e_x} 1 \cdot f_{a0}$ represents $a_0$ scaled by $2e_x$, and $2^{e_{a1} - e_x} 1 \cdot f_{a1}$ represents $a_1$ scaled by $e_x$.

Figure 4:
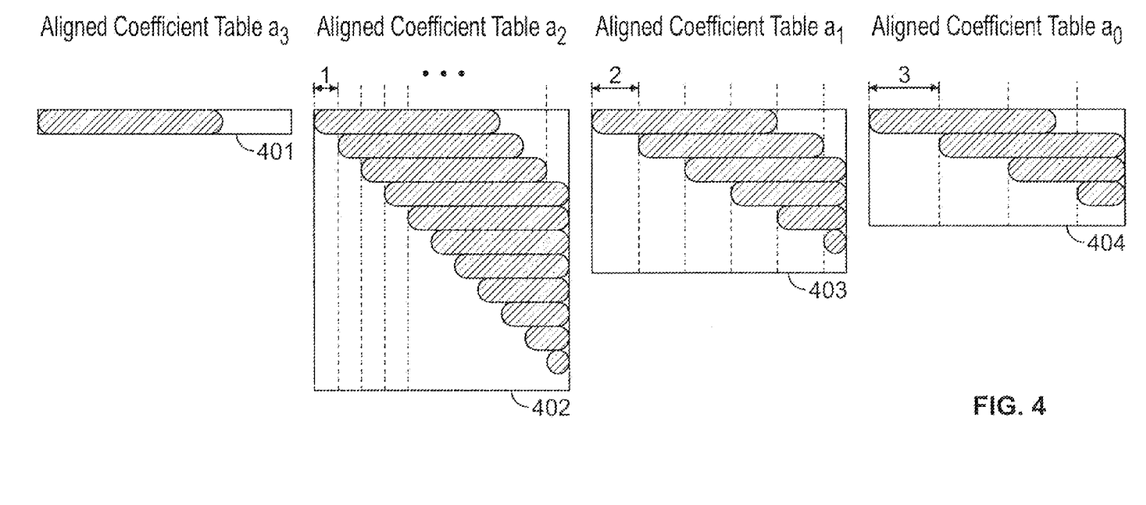
FIG. 4 shows an example of a set of coefficient tables for another range of input values.

Similarly to the $x \le 1$ case, in the $x > 1$ case, the tabulated shifts for the coefficients when have a particular pattern relative to $a_n x^n$ presented in FIG. 4. The relative shifts of the coefficients with respect to $a_n$ (here $a_3$, table 401) depend only on $e_x$, as follows. Coefficient $a_{n-1}$ (here $a_2$, table 402) will be shifted right in increments of one position, coefficient $a_{n-2}$ (here $a_1$, table 403) will be shifted right in increments of two positions, and so on through $a_{n-n=a0}$ (table 404).

Examination of the coefficient tables of FIGS. 3 and 4 reveals that for any given coefficient $a_i$, there is a substantial overlap between the coefficient table for that coefficient in FIG. 3 ($x \le 1$) and the coefficient table for that coefficient in FIG. 4 ($x > 1$). Therefore, in accordance with embodiments of the present invention, it is possible to create merged coefficient tables as shown in FIG. 5.

Figure 5:
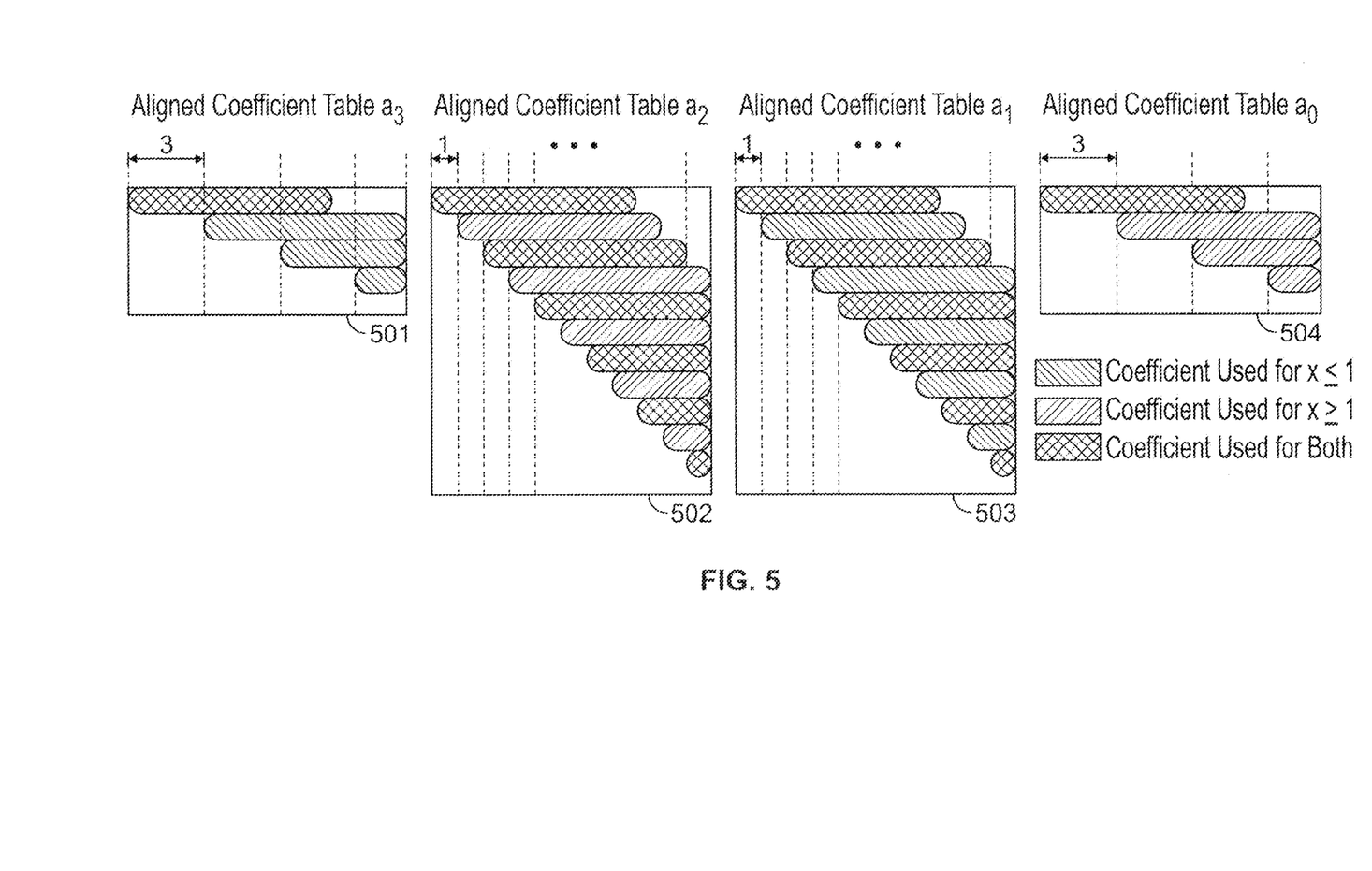
FIG. 5 shows an example of merged coefficient tables for the ranges of FIGS. 3 and 4.

In FIG. 5, a respective table for each coefficient $a_i$ contains all the possible shift cases for that particular coefficient. Thus, each respective table includes a union between the required shift cases for the respective coefficient for $x \le 1$ and the required shift cases for the respective coefficient for $x > 1$, with duplicate shift cases eliminated. In the merged coefficient tables 501-504 of FIG. 5, shifts corresponding to $x \le 1$ are hatched in one direction, shifts corresponding to $x > 1$ are hatched in the other direction, and shifts corresponding to both cases are crossed-hatched.

To the extent that the shifted coefficient values may be in floating-point format, then in accordance with embodiments of the invention, they may be converted to fixed-point format, preserving the width, including the contribution to the width of any guard bits. Taking this format into account, a floating-point output may be constructed using the output fixed-point value and the exponent value of x.

The tables may be structured as follows:

For the case of $x \le 1$, the maximum exponent value that will have to be decoded is 0. The minimum exponent value $e_{min}$ that will have to be decoded is that which would cause the contribution of the i=1 term $xa_1$ to have a weight lower than the accuracy of the i=0 term $a_0$. In such a case, as noted above, for all values of the $e_x$ smaller than $e_{min}$, the output would be $a_0$, because for those values of $e_x$, all other values will be shifted beyond the precision of the available representation. One way to accomplish this is to have the last entry in each table store a coefficient value of 0, and to decode all exponent values smaller than $e_{min}$ to the address of that last entry.

Similarly, for the case of $x > 1$, the minimum exponent value that will have to be decoded is 0. The maximum exponent value $e_{max}$ that will have to be decoded is that which would cause the contribution of the (n−1)th term to be below the precision of the dominant term $a_n x^n$ and therefore to be discarded. Again, one way to accomplish this is to have the last entry in each table store a coefficient value of 0, and to decode all exponent values larger than $e_{max}$ to the address of that last entry.

Figure 6:
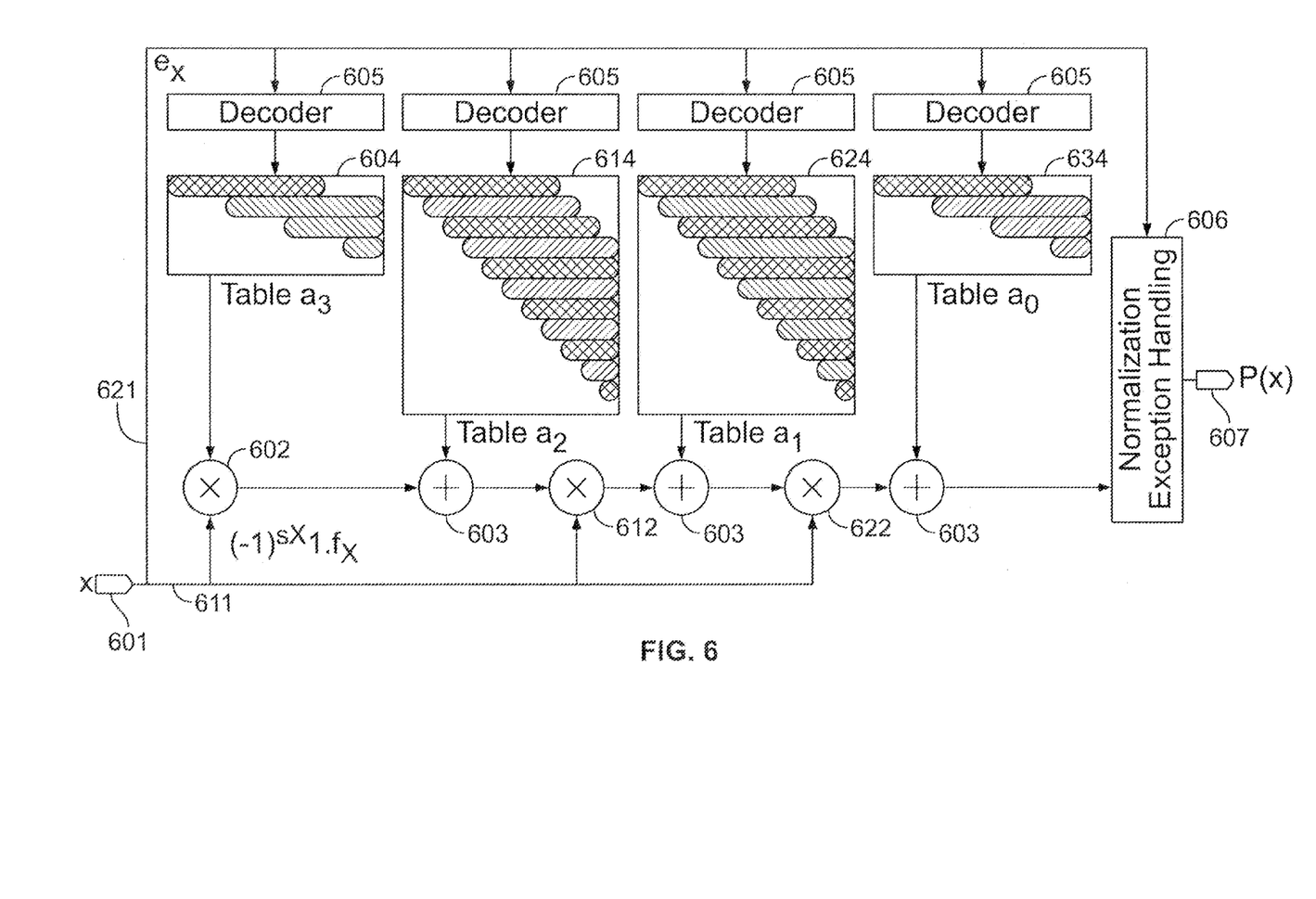
FIG. 6 shows another example of circuitry according to an embodiment of the invention.

FIG. 6 shows an embodiment of circuitry 600 for implementing merged coefficient tables according to an embodiment of the invention.

The variable x is input at 601. The sign and mantissa components of x are input at 611 to multipliers 602, 612, 622. In the case of multiplier 602, for the highest-order term, x is multiplied by the coefficient, selected from table 501 as described below. Implementing Horner's rule, the output of multiplier 602, and of each succeeding multiplier is added at one of adders 603 to the next most significant coefficient from tables 502/503/504, and then multiplied again by x at the next multiplier 612/622. The sum involving the least significant coefficient from table 504 is, in accordance with the Horner's rule formulation, not further multiplied.

Each table 501-504 is stored in a respective separate table memory 604/614/624/634, or in a respective portion of a single memory. For example, various models of FPGAs available from Altera Corporation, of San Jose, Calif., include embedded memory modules in addition to the blocks of programmable logic. The exponent portion of x is routed at 621 to decoders 605 which use the exponent data to select the correct coefficient from each table memory 604/614/624/634. Decoders 605 may be implemented as simple table lookups. For example, in the foregoing FPGAs from Altera Corporation, those table lookups may be implemented in the look-up tables that are provided as logic elements.

The exponent portion of x also is routed to normalization and exception-handling logic 606, where the exponent data are used to normalize the output mantissa 607, and is further routed to logic (not shown) to determine the output exponent.

As an alternative to the set of integrated coefficient tables 501-504, each respective one of coefficient memories 604/614/624/634 could store a respective set of coefficient tables, as in FIGS. 3 and 4, for different ranges of x. In that case, decoders 605 would select the correct coefficient table from each respective set of coefficient tables based on the range of x, and then would select the correct coefficient value from each of the selected tables.

Thus it is seen that circuitry and methods for performing polynomial calculations have been provided. This invention may have use in hard-wired implementations of polynomial calculations, as well as in software implementations.

Another potential use for the present invention may be in programmable devices such as PLDs, as discussed above, where programming software can be provided to allow users to configure a programmable device to perform polynomial calculations, either as an end result or as part of a larger operation. The result would be that fewer logic resources of the programmable device would be consumed. And where the programmable device is provided with a certain number of dedicated blocks for arithmetic functions (to spare the user from having to configure arithmetic functions from general-purpose logic), the number of dedicated blocks needed to be provided (which may be provided at the expense of additional general-purpose logic) can be reduced (or sufficient dedicated blocks for more operations, without further reducing the amount of general-purpose logic, can be provided).

Instructions for carrying out a method according to this invention for programming a programmable device to perform polynomial calculations, may be encoded on a machine-readable medium, to be executed by a suitable computer or similar device to implement the method of the invention for programming or configuring PLDs or other programmable devices to perform operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 7:
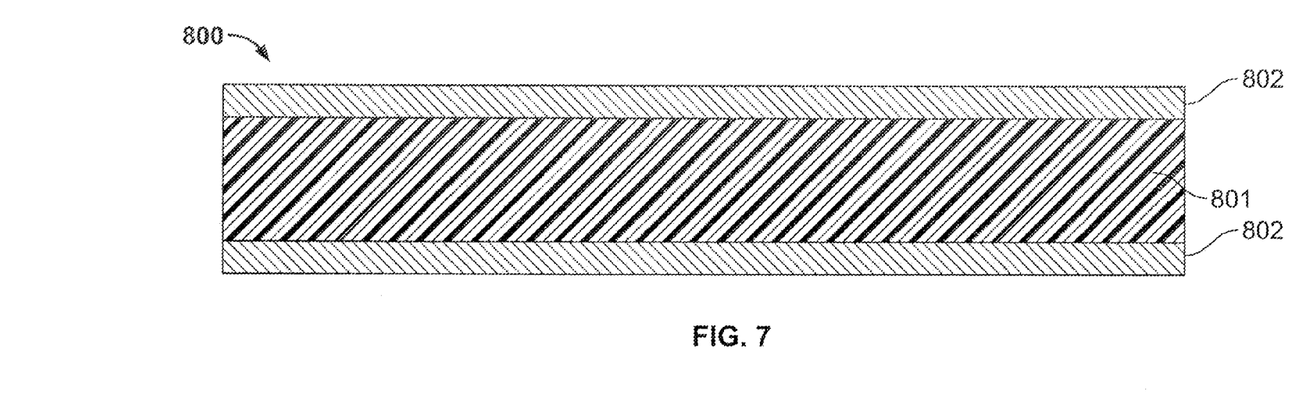
FIG. 7 is a cross-sectional view of a magnetic data storage medium encoded with a set of machine-executable instructions for performing a method according to the present invention.

FIG. 7 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 8:
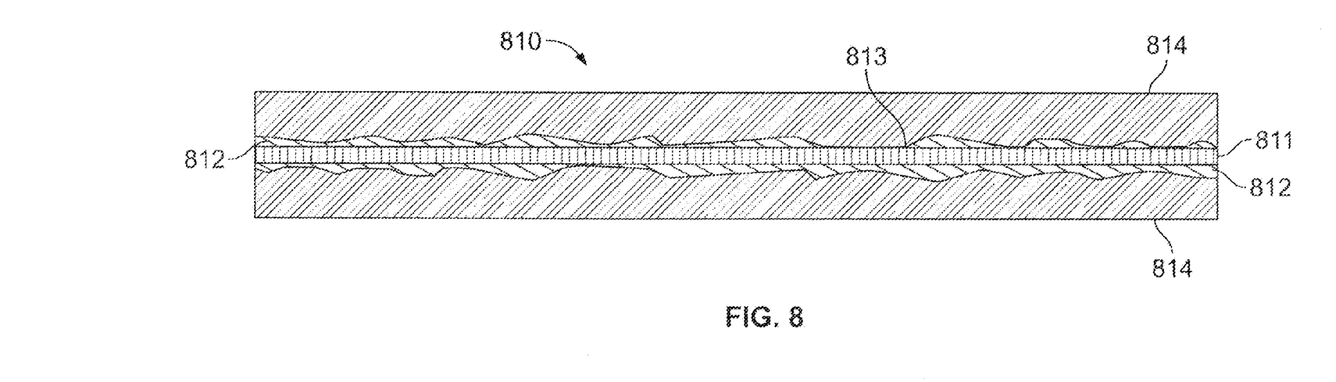
FIG. 8 is a cross-sectional view of an optically readable data storage medium encoded with a set of machine executable instructions for performing a method according to the present invention.

FIG. 8 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

A PLD 90 programmed according to the present invention may be used in many kinds of electronic devices. One possible use is in a data processing system 900 shown in FIG. 9. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

Figure 9:
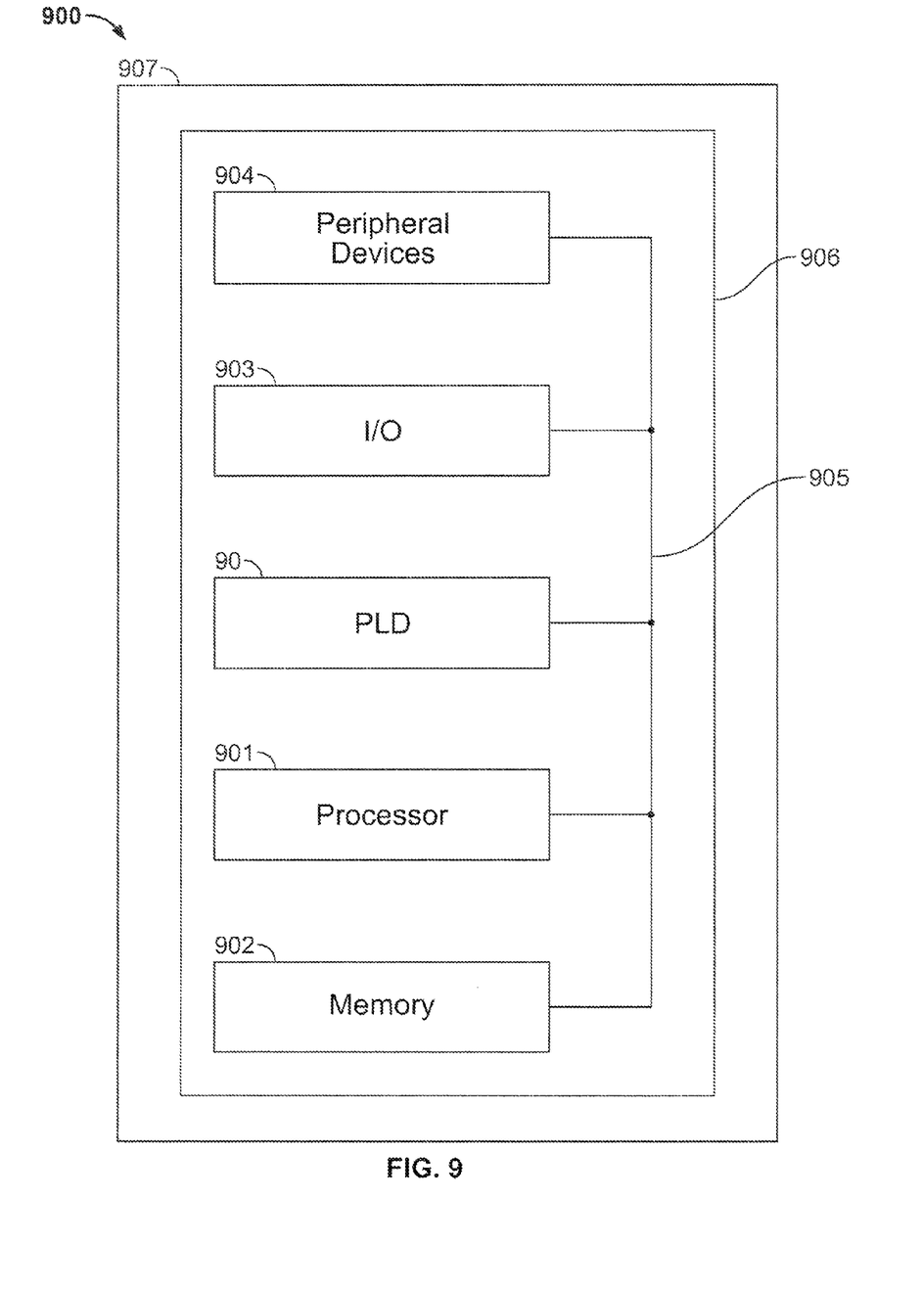
FIG. 9 is a simplified block diagram of an illustrative system employing a programmable logic device incorporating the present invention.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Polynomial circuitry for calculating a polynomial having terms including powers of an input variable, said input variable represented by a mantissa and an exponent, said circuitry comprising:

at least one respective coefficient table corresponding to a respective one of said terms of said polynomial; wherein:

for each respective one of said terms of said polynomial, each respective coefficient table is loaded with a plurality of respective instances of a respective coefficient for said respective one of said terms of said polynomial, and respective instances of said respective coefficient for said respective one of said terms of said polynomial are multiple versions of said respective coefficient, each version being shifted by a different number of bits; and respective decoder circuitry associated with each respective one of said coefficient tables, said respective decoder circuitry selecting one of said instances of said respective coefficient for said respective one of said terms of said polynomial based on said exponent and on a range, from among a plurality of ranges, of input values into which said input variable falls.

2. The polynomial circuitry of claim 1 wherein said range of input values is determined solely by said exponent.

3. The polynomial circuitry of claim 1 wherein:

each said at least one respective coefficient table for said respective one of said terms of said polynomial comprises a plurality of sets of coefficient values for each said respective term; and each of said sets of coefficient values applies to a respective one of said ranges.

4. The polynomial circuitry of claim 3 wherein:

each said at least one respective coefficient table for said respective one of said terms of said polynomial comprises a separate table for each of said sets of coefficient values; and each of said separate tables is stored in a separate memory.

5. The polynomial circuitry of claim 3 wherein:

each said at least one respective coefficient table for said respective one of said terms of said polynomial comprises a separate table for each of said sets of coefficient values; and all of said separate tables are stored in a single memory.

6. The polynomial circuitry of claim 3 wherein, for one of said respective terms, at least one coefficient value for said one of said respective terms of said polynomial in one of said sets of coefficient values is identical to a coefficient value for said one of said respective terms of said polynomial in another of said sets of coefficient values.

7. The polynomial circuitry of claim 6 wherein each of said sets of coefficient values is stored separately in a single memory.

8. The polynomial circuitry of claim 6 wherein:

said sets of coefficient values are interleaved in said single memory, said single memory containing a respective interleaved table for each respective one of said terms of said polynomial; and said decoder circuitry selects an appropriate coefficient for each respective term from each respective interleaved table.

9. The polynomial circuitry of claim 3 comprising:

a respective coefficient memory for a respective one of said terms of said polynomial; wherein:

all respective coefficient values from all of said sets of coefficient values for said one of said respective terms of said polynomial are stored in said respective coefficient memory.

10. The polynomial circuitry of claim 9 wherein each respective set of coefficient values for said one of said respective terms is stored in a separate respective coefficient table that is stored in said respective coefficient memory for said one of said respective terms.

11. The polynomial circuitry of claim 9 wherein:

said respective sets of coefficient values are interleaved in a single interleaved table in said respective coefficient memory; and said decoder circuitry selects an appropriate coefficient for said respective one of said terms of said polynomial from said interleaved table.

12. A method of configuring a programmable device as circuitry calculating a polynomial having terms including powers of an input variable, said input variable represented by a mantissa and an exponent, said method comprising:

configuring, on said programmable device:

at least one respective coefficient table corresponding to a respective one of said terms of said polynomial; wherein:

for each respective one of said terms of said polynomial, each respective coefficient table is loaded with a plurality of respective instances of a respective coefficient for said respective one of said terms of said polynomial, and respective instances of said coefficient for said respective one of said terms of said polynomial are multiple versions of said respective coefficient, each version being shifted by a different number of bits; and respective decoder circuitry associated with each respective one of said coefficient tables, said respective decoder circuitry selecting one of said respective instances of said coefficient for said respective one of said terms of said polynomial based on said exponent and on a range, from among a plurality of ranges, of input values into which said input variable falls.

13. The method of claim 12 wherein said range of input values is determined solely by said exponent.

14. The method of claim 12 wherein:

each said at least one respective coefficient table for each said respective one of said terms of said polynomial comprises a plurality of sets of coefficient values for each said respective one of said terms of said polynomial; and each of said sets of coefficient values applies to a respective one of said ranges.

15. The method of claim 14 wherein:

each said at least one respective coefficient table for each said respective one of said terms of said polynomial comprises a separate table for each of said sets of coefficient values; said method comprising:

configuring a separate memory on said programmable device for each of said coefficient tables.

16. The method of claim 14 wherein:

each said at least one respective coefficient table for each said respective term comprises a separate table for each of said sets of coefficient values; said method comprising:

configuring a single memory on said programmable device for all of said coefficient tables.

17. The method of claim 16 wherein, for one of said respective terms of said polynomial, at least one coefficient value for said one of said respective terms of said polynomial in one of said sets of coefficient values is identical to a coefficient value for said one of said respective terms of said polynomial in another of said sets of coefficient values.

18. The method of claim 17 wherein:

each of said sets of coefficient values is stored separately in said single memory; and said sets of coefficient values are interleaved in said single memory, said single memory containing a respective interleaved table for each respective one of said terms of said polynomial; said method further comprising:

configuring said decoder circuitry to select an appropriate coefficient for each respective one of said terms of said polynomial from each respective interleaved table.

19. The method of claim 17 comprising:
configuring a respective coefficient memory for each one of said respective terms of said polynomial, for storing all respective coefficient values from all of said sets of coefficient values for said one of said respective terms of said polynomial in said respective coefficient memory.

20. The method of claim 19 comprising configuring said respective coefficient memory to store each respective set of coefficient values for said one of said respective terms of said polynomial in a separate respective coefficient table.

21. The method of claim 19 comprising:
configuring said respective coefficient memory to store said respective coefficient values for said one of said respective terms of said polynomial in a single interleaved table in said respective coefficient memory; and
configuring said decoder circuitry to select an appropriate coefficient for said respective one of said terms of said polynomial from said interleaved table.

22. A non-transitory machine-readable data storage medium encoded with non-transitory machine-executable instructions for configuring a programmable device as circuitry for calculating a polynomial having terms including powers of an input variable, said input variable represented by a mantissa and an exponent, said instructions comprising:
instructions to configure at least one respective coefficient table corresponding to a respective one of said terms of said polynomial, wherein:
for each respective one of said terms of said polynomial, each respective coefficient table is loaded with a plurality of respective instances of a respective coefficient for said respective one of said terms of said polynomial, and
respective instances of said coefficient for said respective one of said terms of said polynomial are multiple versions of said respective coefficient, each version being shifted by a different number of bits; and
instructions to configure respective decoder circuitry associated with each respective one of said coefficient tables, said respective decoder circuitry selecting one of said instances of said respective coefficient for said respective one of said terms of said polynomial based on said exponent and on a range, from among a plurality of ranges, of values into which said input variable falls.

* * * * *